United States Patent [19]

Burns et al.

[11] Patent Number: 5,980,852
[45] Date of Patent: Nov. 9, 1999

[54] DIAMOND SYNTHESIS

[76] Inventors: Robert Charles Burns, 15 Los Angeles Drive, Northcliff, Johanesburg, Transvaal; Dennis Leonard Welch, 424 Main Reef Road, Wentworth Park, Krugersdorp, Transvaal, both of South Africa

[21] Appl. No.: 08/203,768

[22] Filed: Mar. 1, 1994

Related U.S. Application Data

[63] Continuation of application No. 07/911,895, Jul. 10, 1992, abandoned.

[30] Foreign Application Priority Data

Jul. 12, 1991 [ZA] South Africa ............................ 91/5453

[51] Int. Cl.⁶ ....................................................... B01J 3/06
[52] U.S. Cl. ................................................. 423/446
[58] Field of Search ............................................... 423/446

[56] References Cited

U.S. PATENT DOCUMENTS

| | | | |
|---|---|---|---|
| 4,632,817 | 12/1986 | Yazu et al. | 423/446 |
| 4,927,619 | 5/1990 | Tsuji | 423/446 |
| 5,273,730 | 12/1993 | Yoshida et al. | 423/446 |

FOREIGN PATENT DOCUMENTS

| | | |
|---|---|---|
| 0290044 | 11/1988 | European Pat. Off. . |
| 86002631 | 1/1986 | Japan . |

*Primary Examiner*—Steven Bos
*Assistant Examiner*—Stuart L. Hendrickson
*Attorney, Agent, or Firm*—Michael N. Meller

[57] ABSTRACT

A reaction vessel for use in producing large diamond crystals of good quality and yield includes a reaction volume and a reaction mass located in the volume. The reaction mass comprises a plurality of seed particles located in or on a surface in the reaction volume and a carbon source separated from the seed particles by a mass of metallic catalyst/solvent for diamond synthesis. The mass comprises alternating layers of carbon-rich and carbon-lean metallic catalyst/solvent which lie parallel or substantially parallel to the surface. There is also provided a mass of alternating layers of carbon-rich and carbon-lean metallic catalyst/solvent.

14 Claims, 1 Drawing Sheet

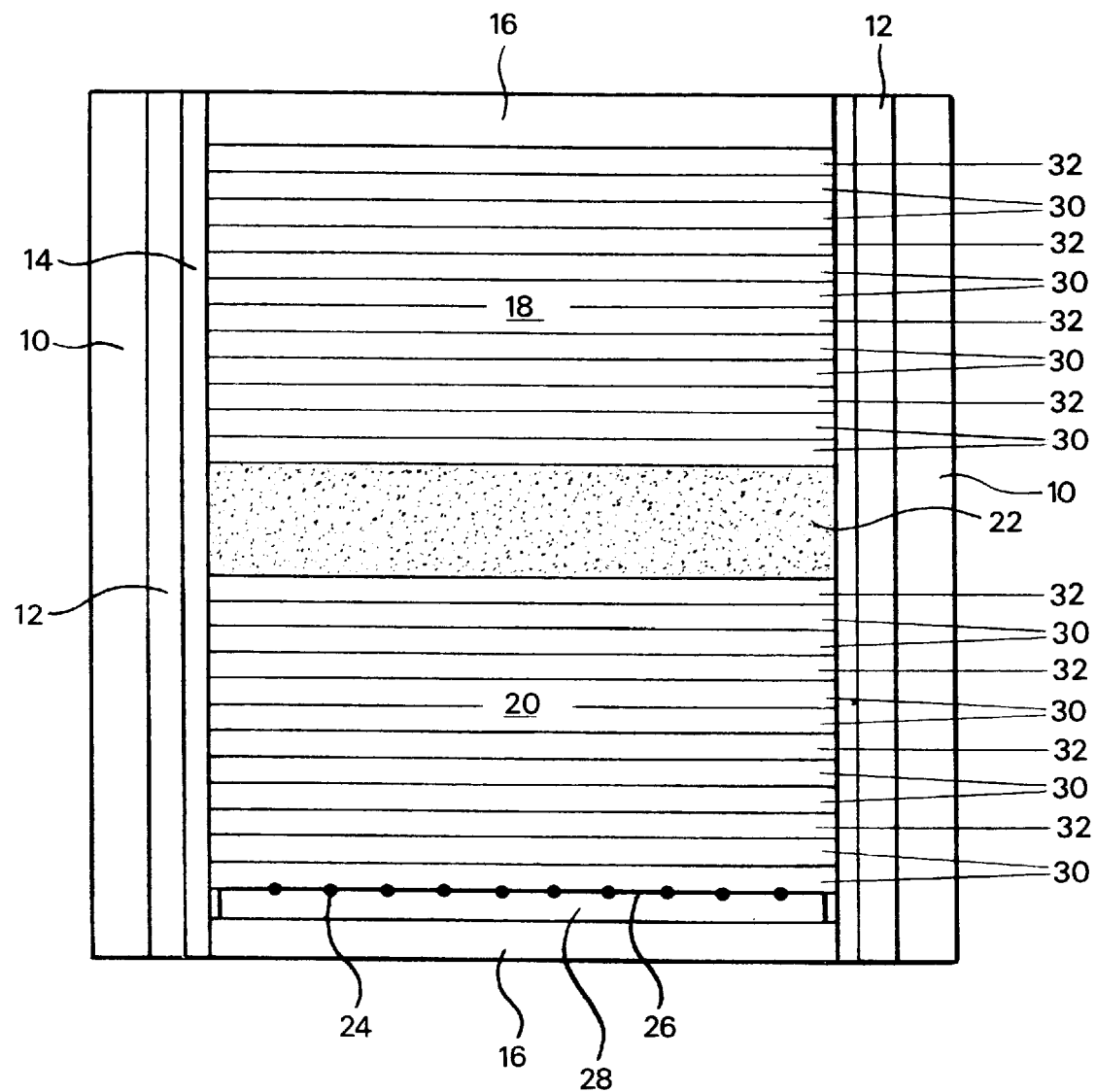

DIAMOND SYNTHESIS

This application is a continuation, of application Ser. No. 911,895, filed Jul. 10, 1992 now abandoned.

BACKGROUND OF THE INVENTION

This invention relates to diamond synthesis.

The synthesis of diamonds using high pressure/high temperature technology has become very well established commercially. This process involves exposing a carbon source to temperatures and pressures in the diamond stable region of the carbon phase diagram in the presence of a suitable catalyst/solvent. Catalysts/solvents useful in diamond synthesis are well known and include metals of Group VIII of the Periodic Table.

While most commercial processes for synthesising diamond produce small or relatively small particles, there are processes known for producing much larger diamonds. These processes generally involve producing the diamond in a reaction vessel in which diamond seed material is separated from a source of substantially pure carbon by a mass of metallic catalyst/solvent such that during synthesis a predetermined temperature gradient between the diamond seed material and the source of carbon is created. The diamond seed material is at a point at which the temperature of the reaction medium will be near the minimum value whilst the source of carbon is placed at a point where the temperature will be near its maximum. A layer of diamond nucleation suppressing material and/or an isolating material is interposed between the mass of metallic catalyst/solvent and the diamond seed material. By way of illustration, reference in this regard may be had to the disclosures of U.S. Pat. Nos. 4,340,576, 4,073,380, 4,034,066, 4,301,134, 3,297,407, 4,322,396 and 4,287,168.

European Patent Publication No. 0290044 describes a method of synthesising large diamond having a diameter of 8 mm or more by the temperature gradient method wherein a (111) or (100) surface of a seed crystal having a diameter of 3 mm or more is used as a growing surface. The entire area of the growing surface is first dissolved in the diamond stable region before crystal growth is started. The crystal growth is effected using a plug of solvent in which the height of the central portion is higher than the height of the peripheral portion. The plug of solvent may contain a certain amount of added carbon.

Japanese Patent Publication No. 2631/1986 describes a process for producing large crystal diamond in a reaction vessel in which a diamond seed is separated from a carbon source by a layer of catalyst/solvent. To minimise seed crystal dissolution, carbon is added to the layer of catalyst/solvent in an amount of 80 to 120 percent of the carbon saturation of the catalyst/solvent under the reaction conditions.

SUMMARY OF THE INVENTION

According to the present invention, a reaction vessel for use in producing diamond crystals includes a reaction volume and a reaction mass located in the volume, the reaction mass comprising a plurality of seed particles located in or on a surface and a carbon source separated from the seed particles by a mass of metallic catalyst/solvent for diamond synthesis, the mass comprising alternating zones of carbon-rich and carbon-lean metallic catalyst/solvent. Such a mass is preferably also provided on the side of the carbon source remote from the seed particles and in contact with such source.

Further according to the invention, a method of producing diamond crystals includes the steps of placing a reaction vessel of the type described above in the reaction zone of a high temperature/high pressure apparatus, and subjecting the reaction mass to conditions of elevated temperature and pressure in the diamond stable region of the carbon phase diagram such that a temperature gradient is created between the seed particles and the carbon source with the seed particles being located at a point near the minimum value of temperature for the temperature gradient and the source of carbon being located at a point near the maximum value of temperature for the temperature gradient, and maintaining these conditions for a time sufficient to produce diamond crystals, preferably large diamond crystals, on the seed particles.

DESCRIPTION OF THE DRAWING

The drawing illustrates a sectional side view of an embodiment of a reaction vessel of the invention.

DESCRIPTION OF EMBODIMENTS

The seed material is preferably diamond seed material. The diamond seed material may be so oriented that the diamond growth occurs predominantly on a {111} or a {100} face of the seed.

The invention allows for relatively large diamonds, e.g. at least 0,1 carat per stone, to be produced in an effective and economic manner. In particular, it has been found that diamonds of this size and good quality can be produced in 15 to 20 hours.

The mass of metallic catalyst/solvent comprises alternating zones of carbon-rich and carbon-lean metallic catalyst/solvent. Typically, the carbon-rich zones will have a carbon concentration of about 3,5 to 5, preferably about 4,5, percent by weight. The carbon-lean zones will typically contain substantially no carbon at all, i.e. less than 400 ppm carbon. The carbon may be dissolved in the metallic catalyst/solvent or may be admixed therewith. It has been found that this arrangement allows for good quality diamond growth on the seed particles without any appreciable dissolution of the seed particles, when such seed is diamond, occurring.

Preferably the carbon concentration in the catalyst/solvent in a combination of the carbon-rich zones and the carbon-lean zones is in the range 3,7 to 4,0 weight percent. A carbon concentration in this range, it has been found, leads not only to the production of large crystal diamond of good quality, but also such diamond in commercially attractive yields.

The seed particles will typically be located on or in the surface of a pad made of a material such as wonderstone, magnesite, sodium chloride or HBN.

An embodiment of the invention will now be described with reference to the accompanying drawing. Referring to this drawing, there is shown a reaction vessel comprising an outer sleeve 10 made of wonderstone enclosing a heater 12 and a wonderstone sleeve 14. End caps 16 of wonderstone are provided to enclose within the sleeve assembly a reaction volume.

Placed within the reaction volume are the materials necessary for diamond synthesis. These materials include two masses 18, 20 of catalyst/solvent. Sandwiched between these two masses is a mass 22 of a carbon source, typically micronised diamond or graphite or a mixture thereof. Diamond seed crystals 24 are partially embedded in, or placed on, the upper surface 26 of a pad 28. The seed material can also be located in depressions or recesses formed in the surface 26. The seed crystals 24 may be placed on or in the surface 26 so that a desired or chosen face is presented to the mass 20. The pad 28 is typically a wonderstone pad.

The masses 18, 20 are essentially the same and consist of alternating zones of carbon-rich catalyst/solvent and carbon-lean catalyst/solvent. The carbon-rich zones consist of two layers 30, while the carbon-lean zones consist of single layers. It will be noted that the layers, and hence the zones, all lie parallel or substantially parallel to the surface 26 and to the carbon source 22. Further, in the mass 20 a carbon-rich layer 30 is in contact with the diamond seed.

The alternating zones could have other shapes, e.g. curved with each zone being concentric with its neighbours.

The carbon-rich layers 30 will typically contain 4,5 percent by weight of carbon which will preferably be admixed with the catalyst/solvent. The carbon-lean layers will typically contain substantially no carbon at all, i.e. less than 400 ppm carbon.

The metallic catalyst/solvent can be any one of a number of metals or alloys known in the art. The preferred catalyst/solvent is a cobalt iron alloy, typically containing 65 percent by weight of cobalt and 35 percent by weight of iron.

In use, the reaction vessel is placed in the reaction zone of a conventional high pressure/high temperature apparatus. The pressure of the reaction zone is increased and the temperature thereafter increased to bring the conditions within the reaction volume into the diamond stable region of the carbon phase diagram. Typical applied pressures are 50 to 70 kilobars, while typical applied temperatures are 1450 to 1650° C. Under these conditions, a temperature gradient is created within the mass 20 such that the higher temperature of this gradient is in the region of the carbon source, whilst the lowest temperature of this gradient is in the region of the seed crystals. The elevated temperature and pressure conditions are maintained for a period of several hours, typically 15 to 20 hours. During this time, carbon source material will dissolve in the mass 20 and diffuse down towards the seed crystals. It has been found that during this carbon dissolution period, no significant dissolution of the seed crystals takes place. The diffusing carbon reaches the seed crystals and causes diamond growth of good quality to occur on the seed crystals. It is further to be noted that this takes place without any nucleation suppressing layer, or barrier layer, as is generally necessary in prior art methods.

The size of the diamond produced on the seed material will vary according to the time during which the elevated temperature and pressure conditions are maintained and the number of seeds.

Large crystal diamond of good quality and yield was produced using a reaction vessel as described above and illustrated in the drawing and using various carbon concentrations in the catalyst/solvent set out in Table I. The catalyst/solvent was a cobalt/iron (65/35 wt %) alloy.

TABLE I

| Mean Carbon Concentration in weight % (percentage of saturation) | | |
|---|---|---|
| Mass 20 | Mass 18 | Overall |
| 3.78 (87.9) | 3.78 (87.9) | 3.78 (87.9) |
| 3.82 (88.8) | 3.86 (89.5) | 3.85 (89.5) |
| 3.83 (89.1) | 3.86 (89.8) | 3.85 (89.5) |

In the above, "mean carbon concentration in weight percent" means the concentration of carbon in the catalyst/solvent in a combination of the carbon-rich layers and the carbon-lean layers. Further, "saturation" means the carbon concentration which will saturate the catalyst/solvent under the reaction conditions.

In contrast, using carbon concentrations of 32,6 percentage of saturation and 93,7 percentage of saturation, failed to produce large crystal diamond of good quality or in commercially attractive yields.

In another set of experiments using the same catalyst/solvent and various other mean carbon concentrations, it was found that at mean carbon concentrations for the overall mass 18, 20 of less than 3,7 percent by weight, the percentage of large diamond crystals of good quality produced dropped significantly, while at mean carbon concentrations greater than 4,0 percent by weight, the yields of large crystal diamond were commercially unattractive. The results of these experiments are set out in Table II.

TABLE II

| Mean Carbon Concentration in weight % (Mass 20, 18) | Diamonds Grown % | Estimated Number of Stones of Quality |
|---|---|---|
| 3, 91 | 100 | 205 |
| 3, 71 | 100 | 188 |
| 3, 63 | 85 | Very low |
| 3, 50 | 80 | Very low |
| 3, 36 | 50 | Very low |
| 3, 06 | 41 | Very low |
| 3, 91 | 100 | 208 |
| 3, 96 | 100 | 227 |
| 4, 01 | 100 | 218 |
| 4, 1 | 100 | 139 |

We claim:
1. A method of producing diamond crystals which includes the steps of placing a reaction vessel in the reaction zone of a high temperature/high pressure apparatus, wherein said reaction vessel includes a reaction volume and a reaction mass located in the volume, the reaction mass comprising a plurality of seed crystals located in or on a surface and a carbon source separated from the seed particles by a mass of metallic solvent for diamond synthesis, the mass comprising a plurality of alternating zones of carbon-rich and carbon-lean metallic solvent extending from the carbon source to the seed particles, and subjecting the reaction mass to conditions of temperature and pressure in the diamond stable region of the carbon phase diagram such that a temperature gradient is created between the seed particles and the carbon source with the seed particles being located at a point approaching the lowest value of temperature for the temperature gradient and the carbon source being located at a point approaching the highest value of temperature for the temperature gradient and maintaining these conditions for a time sufficient to produce diamond crystals on the seed particles.

2. A method according to claim 1 wherein the temperature to which the reaction mass is subjected is in the range 1450 to 1650° C. and the pressure in the range 50 to 70 kilobars.

3. A method according to claim 1 wherein the conditions of elevated temperature and pressure are maintained for a period of 15 to 20 hours.

4. A method according to claim 1 wherein the temperature and pressure conditions are maintained for a period sufficient to produce diamond crystals of at least 0.1 carat per stone.

5. A method according to claim 4 wherein the alternating zones of the reaction vessel lie parallel, or substantially parallel, to the surface in or on which the seed particles are located.

6. A method according to claim 4 wherein a mass of metallic solvent for diamond synthesis is provided on the side of the carbon source remote from the seed particles and is in contact with that source, the mass of metallic solvent comprising alternating zones of carbon-rich and carbon-lean metallic solvent.

7. A method according to claim 4 wherein the carbon-rich zones have a carbon concentration of about 3.5 to 5 percent by weight.

8. A method according to claim 4 wherein the carbon-lean zones have a carbon concentration of less than 400 ppm carbon.

9. A method according to claim 4 wherein the carbon is dissolved in the metallic solvent or is admixed therewith.

10. A method according to claim 4 wherein the carbon concentration of the metallic solvent in a combination of the carbon-rich and carbon-lean zones is in the range 3.7 to 4.0 percent by weight.

11. A method according to claim 4 wherein the seed particles are diamond seed particles.

12. A method according to claim 11 wherein the diamond seed particles are so oriented that the diamond growth occurs predominantly on a {111} or a {100} face of the particles.

13. A method according to claim 4 wherein the metallic solvent is a cobalt/iron alloy.

14. A method according to claim 13 wherein the cobalt/iron alloy contains 65 percent cobalt and 35 percent by weight iron.

* * * * *